J. C. DOUST.
RAKE.
APPLICATION FILED MAR. 13, 1915.
1,158,649.
Patented Nov. 2, 1915.
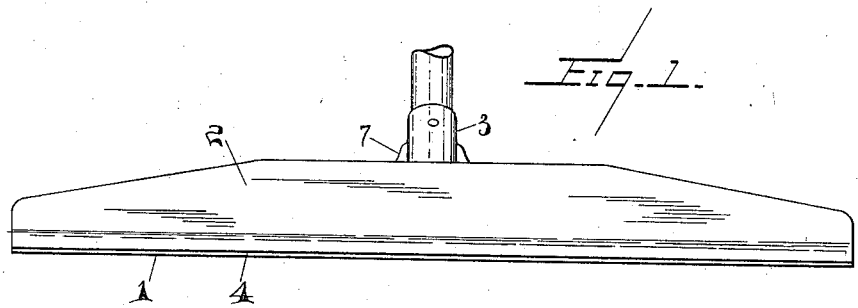
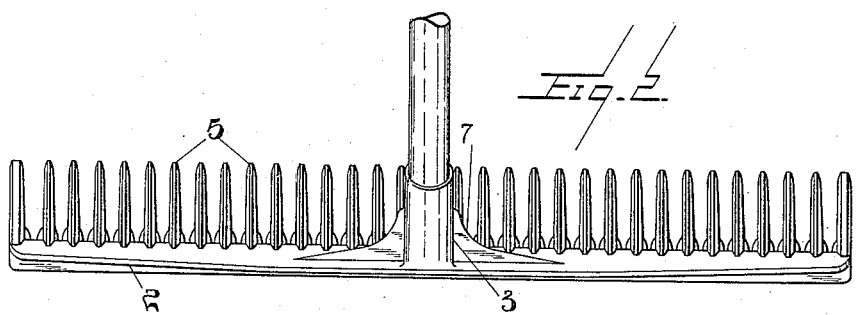
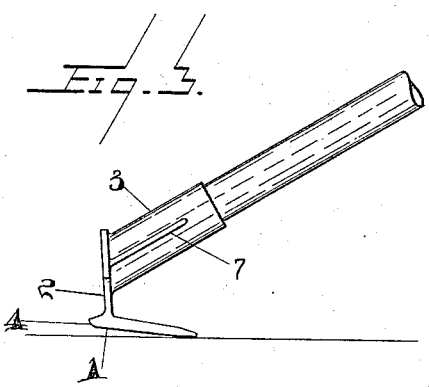
WITNESSES.
N. R. Tyndall.
E. P. Hall.
INVENTOR.
J. C. Doust.
By J. Edward Maybee.
ATTY.

UNITED STATES PATENT OFFICE.

JAMES CALIB DOUST, OF TORONTO, ONTARIO, CANADA, ASSIGNOR OF THREE-FOURTHS TO JAMES H. LUMBERS, OF TORONTO, CANADA.

RAKE.

1,158,649.        Specification of Letters Patent.        Patented Nov. 2, 1915.

Application filed March 13, 1915. Serial No. 14,176.

*To all whom it may concern:*

Be it known that I, JAMES CALIB DOUST, of the city of Toronto, in the county of York, Province of Ontario, Canada, a subject of the King of Great Britain, have invented certain new and useful Improvements in Rakes, of which the following is a specification.

This invention relates to garden rakes and my object is to devise a rake particularly adapted for a lawn rake, but useful also in leveling and grading walks and in the seed beds.

I attain my object by means of the constructions hereinafter described and illustrated in the accompanying drawings in which—

Figure 1 is a front elevation of a rake constructed in accordance with my invention; Fig. 2 a plan view of the same; Fig. 3 a side elevation of the same; and Fig. 4 a rear elevation of part of the same showing the shape of the teeth.

In the drawings like numerals of reference indicate corresponding parts in the different figures.

The rake is preferably formed as an integral casting. The rake comprises a plate 1, which, when the rake is in use as a lawn rake, will be nearly horizontal as shown in Fig. 3, a plate 2, which under similar conditions is substantially vertical, and an upwardly and rearwardly inclined socket 3.

The plate 1 preferably extends slightly forward of the plate 2 to form the forwardly projecting flange 4. The plate 1 is formed with teeth 5, which are preferably slightly tapered and pointed. Near the base of each tooth the width is increased to form a comparatively abrupt taper in the width of the spaces between the teeth. Preferably this increase in the width of each tooth is on convex curves as shown particularly in Fig. 2, the curves not meeting at a point but being separated slightly at their inner ends.

The spaces between the teeth preferably do not extend quite up to the plate 2, giving greater strength to the connection between the teeth and the plate 2 at this point.

The connection between the socket 3 and the plate 2 is preferably strengthened by the lateral ribs 7.

When in use as a lawn rake, the position is as indicated in Fig. 3. The rake is very effective in clearing the lawn of cut grass, and the peculiar shape of the teeth in plan as described and shown in Fig. 2, makes the rake very effective in removing dandelion heads. The rake is also valuable as a garden rake. In smoothing seed beds or garden walks, the flange 4 is very serviceable, the rake being pushed forwardly. The plate 2 makes an effective grass catcher so that the grass raked up is easily drawn into heaps for removal. This plate also stiffens and strengthens the plate 1 on which the teeth are formed.

What I claim as my invention is:

A rake comprising two integral plates at an angle to one another, one formed with teeth which when the other plate is substantially vertical are nearly horizontal; and an integral inclined socket extending rearwardly and upwardly from the rear side of the vertical plate over the teeth, a portion of the lower plate extending forward of the vertical plate in the same plane as the teeth.

Signed at Toronto, Canada, this 2nd day of March 1915, in the presence of the two undersigned witnesses.

JAMES CALIB DOUST.

Witnesses:
GEO. P. MACKIE,
N. R. TYNDALL.

Copies of this patent may be obtained for five cents each, by addressing the "Commissioner of Patents, Washington, D. C."